(12) United States Patent
Mitchell et al.

(10) Patent No.: US 11,905,208 B2
(45) Date of Patent: *Feb. 20, 2024

(54) GLASS AND GLASS-CERAMIC COMPOSITIONS

(71) Applicant: Corning Incorporated, Corning, NY (US)

(72) Inventors: Alexandra Lai Ching Kao Andrews Mitchell, Ithaca, NY (US); Steven Alvin Tietje, Lindley, NY (US)

(73) Assignee: Corning Incorporated, Corning, NY (US)

( * ) Notice: Subject to any disclaimer, the term of this patent is extended or adjusted under 35 U.S.C. 154(b) by 76 days.

This patent is subject to a terminal disclaimer.

(21) Appl. No.: 17/319,538

(22) Filed: May 13, 2021

(65) Prior Publication Data

US 2021/0355021 A1 Nov. 18, 2021

Related U.S. Application Data

(60) Provisional application No. 63/024,835, filed on May 14, 2020.

(30) Foreign Application Priority Data

Sep. 18, 2020 (KR) .................. 10-2020-0120241

(51) Int. Cl.
*C03C 10/00* (2006.01)
*C03C 10/12* (2006.01)
*C03C 3/095* (2006.01)
*C03C 3/062* (2006.01)

(52) U.S. Cl.
CPC .............. *C03C 3/095* (2013.01); *C03C 3/062* (2013.01); *C03C 10/0027* (2013.01); *C03C 2204/00* (2013.01)

(58) Field of Classification Search
CPC .. C03C 10/00; C03C 10/0009; C03C 10/0027
See application file for complete search history.

(56) References Cited

U.S. PATENT DOCUMENTS

2001/0056016 A1* 12/2001 Nagata .................... C03B 32/02
501/63
2001/0056018 A1* 12/2001 Nagata ................ C03C 10/0045
501/63
2002/0028740 A1* 3/2002 Zou ..................... C03C 10/0045
501/9

(Continued)

FOREIGN PATENT DOCUMENTS

CN 103319092 A * 9/2013
EP 941973 A2 * 9/1999 ......... C03C 10/0027

(Continued)

*Primary Examiner* — Karl E Group
(74) *Attorney, Agent, or Firm* — Russell S. Magaziner

(57) ABSTRACT

A composition includes: 30 mol % to 60 mol % $SiO_2$; 15 mol % to 35 mol % $Al_2O_3$; 5 mol % to 25 mol % $Y_2O_3$; 0 mol % to 20 mol % $TiO_2$; and 0 mol % to 25 mol % $R_2O$, such that $R_2O$ is the sum of $Na_2O$, $K_2O$, $Li_2O$, $Rb_2O$, and $Cs_2O$.

8 Claims, 8 Drawing Sheets

(56) References Cited

U.S. PATENT DOCUMENTS

2006/0166804 A1\* 7/2006 Sprenger ................. C03C 3/062
  501/9
2007/0281851 A1\* 12/2007 Seneschal-Merz ..... C03C 3/062
  252/301.4 F
2021/0179480 A1\* 6/2021 Mao ........................ H01L 23/10
2021/0371326 A1\* 12/2021 Mitchell ............. C03C 10/0036

FOREIGN PATENT DOCUMENTS

| EP | 1577275 | A2 | \* | 9/2005 | ......... C03C 10/0027 |
| EP | 2011770 | A2 | \* | 1/2009 | ......... C03C 10/0027 |
| JP | 11322363 | A | \* | 11/1999 | ......... C03C 10/0027 |

\* cited by examiner

GLASS AND GLASS-CERAMIC COMPOSITIONS

This application claims the benefit of priority under 35 U.S.C. § 119 of U.S. Provisional Application Ser. No. 63/024,835, filed on May 14, 2020, and Korean Patent Application Serial No. 10-2020-0120241, filed on Sep. 18, 2020, the contents of each of which are relied upon and incorporated herein by reference in their entirety.

BACKGROUND

1. Field

The disclosure relates to novel glass and glass-ceramic compositions.

2. Technical Background

High strength glass and glass-ceramic materials are necessary for a broad range of applications including handheld devices, memory disks, and fibers. For glasses, sufficient mechanical attributes may be achieved with compositions containing high proportions of high field strength oxides (e.g., MgO, $Y_2O_3$, $La_2O_3$, etc.). Glass-ceramics pose a more complicated problem. Designing mechanically-advantaged glass-ceramics is more unpredictable, as precursor glass compositions do not necessarily indicate how the composite material (crystallites plus residual glass) will behave.

Thus, as described herein, novel glass and glass-ceramic compositions are disclosed having predictable, superior mechanical properties.

SUMMARY

In some embodiments, a composition, comprises: 30 mol % to 60 mol % $SiO_2$; 15 mol % to 35 mol % $Al_2O_3$; 5 mol % to 25 mol % $Y_2O_3$; 0 mol % to 20 mol % $TiO_2$; and 0 mol % to 25 mol % $R_2O$, wherein $R_2O$ is the sum of $Na_2O$, $K_2O$, $Li_2O$, $Rb_2O$, and $Cs_2O$.

In one aspect, which is combinable with any of the other aspects or embodiments, $R_2O$ is the sum of $Na_2O$ and $Li_2O$. In one aspect, which is combinable with any of the other aspects or embodiments, $R_2O$ consists of $Na_2O$ or $Li_2O$. In one aspect, which is combinable with any of the other aspects or embodiments, $R_2O$ comprises 0 mol % to 12.5 mol % $Na_2O$. In one aspect, which is combinable with any of the other aspects or embodiments, $R_2O$ comprises 0 mol % to 12.5 mol % $Li_2O$.

In one aspect, which is combinable with any of the other aspects or embodiments, the composition further comprises 0 mol % to 2.5 mol % $B_2O_3$. In one aspect, which is combinable with any of the other aspects or embodiments, the composition further comprises 0 mol % to 4 mol % $ZrO_2$.

In one aspect, which is combinable with any of the other aspects or embodiments, the composition comprises: 30 mol % to 40 mol % $SiO_2$; 25 mol % to 35 mol % $Al_2O_3$; 8 mol % to 14 mol % $Y_2O_3$; and 4 mol % to 18 mol % $TiO_2$. In one aspect, which is combinable with any of the other aspects or embodiments, the composition comprises: 0 mol % to 12.5 mol % $Li_2O$; 0 mol % to 10.5 mol % $Na_2O$; and 0 mol % to 2.5 mol % $B_2O_3$.

In one aspect, which is combinable with any of the other aspects or embodiments, the composition comprises: 30 mol % to 50 mol % $SiO_2$; 18 mol % to 30 mol % $Al_2O_3$; 10 mol % to 15 mol % $Y_2O_3$; and 4 mol % to 14 mol % $TiO_2$. In one aspect, which is combinable with any of the other aspects or embodiments, the composition comprises: 0 mol % to 11.5 mol % $Li_2O$; 0 mol % to 10.5 mol % $Na_2O$; and 0 mol % to 4 mol % $ZrO_2$.

In one aspect, which is combinable with any of the other aspects or embodiments, a ratio of $R_2O$ to $Al_2O_3$ is in a range of 0.1 to 1; or a ratio of $Al_2O_3$ to $Y_2O_3$ is in a range of 0.1 to 5; or a ratio of $TiO_2$ to $Y_2O_3$ is in a range of 0.1 to 5; or a ratio of $TiO_2$ to the sum of $Y_2O_3$ and $Al_2O_3$ is in a range of 0.1 to 1; or a ratio of $TiO_2$ to $SiO_2$ is in a range of 0.05 to 1.

In one aspect, which is combinable with any of the other aspects or embodiments, a ratio of $R_2O$ to $Al_2O_3$ is in a range of 0.3 to 0.7; or a ratio of $Al_2O_3$ to $Y_2O_3$ is in a range of 1 to 4; or a ratio of $TiO_2$ to $Y_2O_3$ is in a range of 0.25 to 1.75; or a ratio of $TiO_2$ to the sum of $Y_2O_3$ and $Al_2O_3$ is in a range of 0.1 to 0.5; or a ratio of $TiO_2$ to $SiO_2$ is in a range of 0.05 to 0.75.

In one aspect, which is combinable with any of the other aspects or embodiments, the composition is a glass composition. In one aspect, which is combinable with any of the other aspects or embodiments, the composition is a glass-ceramic composition.

In some embodiments, a glass composition has a Young's modulus in a range of 107 GPa to 126 GPa. In some embodiments, a glass-ceramic composition has a Young's modulus in a range of 119 GPa to 177 GPa.

BRIEF DESCRIPTION OF THE DRAWINGS

The disclosure will become more fully understood from the following detailed description, taken in conjunction with the accompanying figures, in which.

DETAILED DESCRIPTION

Figure 1A:
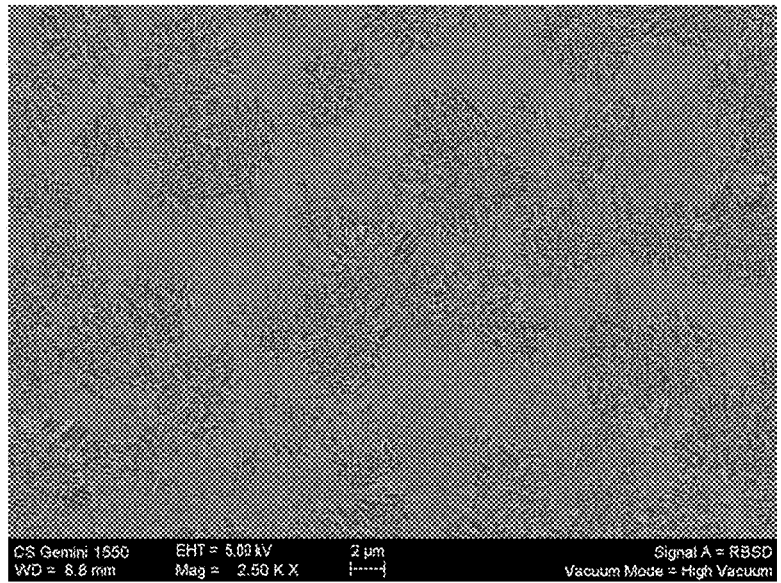
FIGS. 1A-1I illustrate back-scattered scanning electron microscopy (SEM) images of Li-only containing glass-ceramic microstructures, according to some embodiments.

In the following description, whenever a group is described as comprising at least one of a group of elements and combinations thereof, it is understood that the group may comprise, consist essentially of, or consist of any number of those elements recited, either individually or in combination with each other. Similarly, whenever a group is described as consisting of at least one of a group of elements or combinations thereof, it is understood that the group may consist of any number of those elements recited, either individually or in combination with each other. Unless otherwise specified, a range of values, when recited, includes both the upper and lower limits of the range as well as any ranges therebetween. It also is understood that the various features disclosed in the specification and the drawings can be used in any and all combinations.

Where a range of numerical values is recited herein, comprising upper and lower values, unless otherwise stated in specific circumstances, the range is intended to include the endpoints thereof, and all integers and fractions within the range. It is not intended that the scope of the claims be limited to the specific values recited when defining a range. Further, when an amount, concentration, or other value or parameter is given as a range, one or more preferred ranges or a list of upper preferable values and lower preferable values, this is to be understood as specifically disclosing all ranges formed from any pair of any upper range limit or preferred value and any lower range limit or preferred value, regardless of whether such pairs are separately disclosed. Finally, when the term "about" is used in describing a value or an end-point of a range, the disclosure should be understood to include the specific value or end-point referred to. When a numerical value or end-point of a range does not recite "about," the numerical value or end-point of a range is intended to include two embodiments: one modified by "about," and one not modified by "about."

Herein, glass and glass-ceramic compositions are expressed in terms of mol % amounts of particular components included therein on an oxide bases unless otherwise indicated. Any component having more than one oxidation state may be present in a glass or glass-ceramic composition in any oxidation state. However, concentrations of such component are expressed in terms of the oxide in which such component is at its lowest oxidation state unless otherwise indicated.

Unless otherwise specified, all compositions are expressed in terms of mole percent (mol %). Young's modulus, shear modulus, and Poisson's ratio are all measured at the same time using Resonant Ultrasound Spectroscopy, which is conducted as set forth in ASTM E1875-00e1.

Glass and Glass-Ceramic Compositions

Novel compositions disclosed herein include mechanically-advantaged and ion-exchangeable precursor glasses, as well as strong, high Young's modulus, high hardness, and ion-exchangeable glass-ceramics. The precursor glasses are unique because they comprise extremely high $Al_2O_3$ and $Y_2O_3$ contents, and low $SiO_2$ contents. The glass-ceramics have novel phase assemblages as well as microstructures (e.g., homogenous and internally nucleated). Moreover, in addition to their inherent strength, the disclosed glass and glass-ceramic compositions may be chemically strengthened, further increasing their damage resistance from surface flaws.

As referred to herein, "compositions" may refer to either "glass compositions" or "glass-ceramic compositions." Substantial compositional equivalence is expected between the precursor glass and glass-ceramic after heat treatment (ceramming) of the precursor glass (explained below).

Silicon dioxide ($SiO_2$), which serves as the primary oxide component of the embodied compositions, may be included to provide high temperature stability and chemical durability. In some examples, compositions may comprise 30 mol % to 60 mol % $SiO_2$. In some examples, the composition may comprise 30 mol % to 50 mol % $SiO_2$. In some examples, the composition may comprise 30 mol % to 35 mol % $SiO_2$, or 35 mol % to 40 mol % $SiO_2$, or 40 mol % to 45 mol % $SiO_2$, or 45 mol % to 50 mol % $SiO_2$, or 50 mol % to 55 mol % $SiO_2$, or 55 mol % to 60 mol % $SiO_2$, or 30 mol % to 40 mol % $SiO_2$, or 35 mol % to 50 mol % $SiO_2$, or 40 mol % to 50 mol % $SiO_2$, or any value or range disclosed therein. In some examples, the composition is essentially free of $SiO_2$ or comprises 30, 31, 32, 33, 34, 35, 36, 37, 38, 39, 40, 41, 42, 43, 44, 45, 46, 47, 48, 49, 50 mol % $SiO_2$, or any value or range having endpoints disclosed herein.

A network former is an oxide component of a glass that forms a backbone of the glass structure. Some examples include $SiO_2$, $Al_2O_3$, $P_2O_5$, and $B_2O_3$. Alumina ($Al_2O_3$) may influence the structure of the composition and, additionally, lower the liquidus temperature and coefficient of thermal expansion, or, enhance the strain point. In addition to its role as a network former, $Al_2O_3$ (and $ZrO_2$) help improve chemical durability in silicate-based compositions while having no toxicity concerns.

Moreover, alumina ($Al_2O_3$) advantageously contributes to increased mechanical strength of the composition. The compositions disclosed herein are unique due to their high $Al_2O_3$ contents. Along with yttria, alumina has amongst the most significant effect on increasing elastic modulus, E (GPa) of the glass or glass-ceramic compositions. At least due to the concentrations of alumina, glass compositions and glass-ceramic compositions are achieved having high Young's modulus values (107-126 GPa and 119-177 GPa, respectively). Moreover, glass-ceramic compositions also have high fracture toughness (0.99-3.2 MPa*√m) and high Vickers hardness (868-1192 $kgf/mm^2$).

In some examples, the composition may comprise 15 mol % to 35 mol % $Al_2O_3$. In some examples, the composition may comprise 18 mol % to 31 mol % $Al_2O_3$. In some examples, the composition may comprise 15 mol % to 20 mol % $Al_2O_3$, or 20 mol % to 25 mol % $Al_2O_3$, or 25 mol % to 30 mol % $Al_2O_3$, or 30 mol % to 35 mol % $Al_2O_3$, or 18 mol % to 30 mol % $Al_2O_3$, or 25 mol % to 31 mol % $Al_2O_3$, or 18 mol % to 21 mol % $Al_2O_3$, or 21 mol % to 24 mol % $Al_2O_3$, or 24 mol % to 27 mol % $Al_2O_3$, or 27 mol % to 30 mol % $Al_2O_3$, or 30 mol % to 33 mol % $Al_2O_3$, or 25 mol % to 35 mol % $Al_2O_3$, or any value or range disclosed therein. In some examples, the composition comprises 15, 16, 17, 18, 19, 20, 21, 22, 23, 24, 25, 26, 27, 28, 29, 30, 31, 32, 33, 34, 35 mol % $Al_2O_3$, or any value or range having endpoints disclosed herein.

Zirconium dioxide ($ZrO_2$) behaves as a nucleating agent, which facilitates internal nucleation and is an important first step in crystallization. In some examples, the composition may comprise 0 mol % to 10 mol % $ZrO_2$. In some examples, the composition may comprise 0 mol % to 5 mol % $ZrO_2$. In some examples, the composition may comprise 0 mol % to 4 mol % $ZrO_2$, or 0.5 mol % to 3.5 mol % $ZrO_2$, or 1 mol % to 3 mol % $ZrO_2$, or any value or range disclosed therein. In some examples, the composition comprises 0, >0, 0.5, 1, 1.5, 2, 2.5, 3, 3.5, 4 mol % $ZrO_2$, or any value or range having endpoints disclosed herein.

Alkali oxides ($R_2O$, which is the sum of $Na_2O$, $K_2O$, $Li_2O$, $Rb_2O$, and/or $Cs_2O$) serve as aids in achieving low melting temperature and low liquidus temperatures and/or help to improve bioactivity, if needed, and/or influence the coefficient of thermal expansion, especially at low temperatures. In some examples, the composition may comprise 0 mol % to 25 mol % $R_2O$. In some examples, the composition may comprise 0 mol % to 22 mol % $R_2O$. In some examples, the composition may comprise 0 mol % to 22 mol % $Na_2O$ and $Li_2O$ combined. In some examples, the composition may comprise 1 mol % to 20 mol %, or 3 mol % to 17 mol %, or 4 mol % to 16 mol %, or 4.5 mol % to 15.5 mol %, or 5 mol % to 15 mol %, or 0 mol % to 15 mol % $R_2O$, or any value or range disclosed therein. In some examples, the composition may comprise 0 mol % to 15 mol % $Na_2O$, or 0 mol % to 12.5 mol % $Na_2O$, 0 mol % to 10.5 mol % $Na_2O$, or any value or range disclosed therein. In some examples, the composition may comprise 0 mol % to 15 mol % $Li_2O$, or 0 mol % to 12.5 mol % $Li_2O$, 0 mol % to 11.5 mol % $Li_2O$, or any value or range disclosed therein. In some examples, the composition comprises 0, >0, 1, 2, 3, 4, 5, 6, 7, 8, 9, 10, 11, 12, 13, 14, 15, 16, 17, 18, 19, 20, 21, 22, 23, 24, 25 mol % $R_2O$ (e.g., $Na_2O$, $K_2O$, $Li_2O$, $Rb_2O$, $Cs_2O$, or combinations thereof), or any value or range having endpoints disclosed herein.

Yttrium oxide ($Y_2O_3$) advantageously contributes to increased mechanical strength of the composition. The compositions disclosed herein are unique due to their high $Y_2O_3$ contents. Along with alumina, yttria has amongst the most significant effect on increasing elastic modulus, E (GPa) of the glass or glass-ceramic compositions. At least due to the concentrations of yttria, glass compositions and glass-ceramic compositions are achieved having high Young's modulus values (107-126 GPa and 119-177 GPa, respectively). Moreover, glass-ceramic compositions also have high fracture toughness (0.99-3.2 MPa*√m) and high Vickers hardness (868-1192 kgf/mm$^2$).

For the glass compositions, these properties may be due to a high field strength of network modifiers in these glasses. The close packing structure occurs due to the high field strength and leads to high modulus, as well as high density and refractive index. For glass-ceramic compositions, various crystalline phases increase mechanical properties of the bulk materials relative to their precursor glasses (e.g., as explained in Example 4 below). The phases that contribute most to this increase in mechanical properties are $Y_2Ti_2O_7$, $Y_2Si_2O_7$, and $Y_3Al_5O_{12}$ (yttrium aluminum garnet, YAG). The increase in Young's modulus is achieved most in the Li-only containing compositions, though the increase in Young's modulus is still significant for Na-only glass-ceramics as well.

In some examples, the composition may comprise 5 mol % to 25 mol % $Y_2O_3$. In some examples, the composition may comprise 8 mol % to 14 mol % $Y_2O_3$. In some examples, the composition may comprise 10 mol % to 15 mol % $Y_2O_3$. In some examples, the composition may comprise 7 mol % to 23 mol % $Y_2O_3$ or 10 mol % to 20 mol % $Y_2O_3$, or any value or range disclosed therein. In some examples, the composition comprises 5, 6, 7, 8, 9, 10, 11, 12, 13, 14, 15, 16, 17, 18, 19, 20, 21, 22, 23, 24, 25 mol % $Y_2O_3$, or any value or range having endpoints disclosed herein.

Diboron trioxide ($B_2O_3$) helps to lower liquidus temperature and increase the amount of residual glass in the glass-ceramic composition. At present, liquidus temperatures of the compositions disclosed herein are significantly lower than has been achieved for other glass-ceramics having comparably high Young's modulus, such as enstatite glass-ceramics. In some examples, the composition may comprise 0 mol % to 5 mol % $B_2O_3$. In some examples, the composition may comprise 0 mol % to 2.5 mol % $B_2O_3$. In some examples, the composition may comprise 0 mol % to 1 mol % $B_2O_3$. In some examples, the composition may comprise 0 mol % to 4 mol % $B_2O_3$, or 0.5 mol % to 3.5 mol % $B_2O_3$, or 1 mol % to 3 mol % $B_2O_3$, or any value or range disclosed therein. In some examples, the composition comprises 0, >0, 0.5, 1, 1.5, 2, 2.5, 3, 3.5, 4, 4.5, 5 mol % $B_2O_3$, or any value or range having endpoints disclosed herein.

Titanium dioxide ($TiO_2$) behaves as a nucleating agent, which facilitates internal nucleation and is an important first step in crystallization. In some examples, the composition may comprise 0 mol % to 20 mol % $TiO_2$. In some examples, the composition may comprise 5 mol % to 20 mol % $TiO_2$. In some examples, the composition may comprise 4 mol % to 14 mol % $TiO_2$. In some examples, the composition may comprise 4 mol % to 18 mol % $TiO_2$, or 6 mol % to 18 mol % $TiO_2$, or 6 mol % to 16 mol % $TiO_2$, or 8 mol % to 16 mol % $TiO_2$, or 8 mol % to 14 mol % $TiO_2$, or any value or range disclosed therein. In some examples, the composition comprises 5, 6, 7, 8, 9, 10, 11, 12, 13, 14, 15, 16, 17, 18, 19, 20 mol % $TiO_2$, or any value or range having endpoints disclosed herein.

Other compositions may include phosphorus pentoxide ($P_2O_5$), network modifiers alkaline earth oxides (MgO, CaO, SrO, and/or BaO) and zinc oxide (ZnO). Phosphorus pentoxide ($P_2O_5$) may also serve as a network former, as well as help to increase composition viscosity, which in turn expands the range of operating temperatures, and is therefore an advantage to the manufacture and formation of the glass and/or glass-ceramic composition. Alkaline earth oxides may improve desirable properties in the materials, including increasing Young's modulus and the coefficient of thermal expansion. In some examples, zinc oxide (ZnO) may behave similar to alkaline earth oxides (e.g., MgO).

Additional components can be incorporated into the composition to provide additional benefits or may be incorporated as contaminants typically found in commercially-prepared compositions. For example, additional components can be added as coloring or fining agents (e.g., to facilitate removal of gaseous inclusions from melted batch materials used to produce the composition) and/or for other purposes. In some examples, the composition may comprise one or more compounds useful as ultraviolet radiation absorbers. In some examples, the composition can comprise CeO, MnO, $Nb_2O_5$, $MoO_3$, $Ta_2O_5$, $WO_3$, $SnO_2$, $Fe_2O_3$, $As_2O_3$, $Sb_2O_3$, Cl, Br, or combinations thereof. The compositions, according to some examples, can also include various contaminants associated with batch materials and/or introduced into the composition by the melting, fining, and/or forming equipment used to produce the composition. For example, in some embodiments, the composition can comprise $SnO_2$ or $Fe_2O_3$, or combinations thereof.

In some examples, the composition comprises a combination of $SiO_2$, $Al_2O_3$, $Y_2O_3$, and $TiO_2$. For example, the composition comprises 30 mol % to 40 mol % $SiO_2$, 25 mol % to 35 mol % $Al_2O_3$, 8 mol % to 14 mol % $Y_2O_3$, and 4 mol % to 18 mol % $TiO_2$. In some examples, the composition further comprises $Li_2O$, $Na_2O$, and $B_2O_3$. For example, the composition comprises 0 mol % to 12.5 mol % $Li_2O$, 0 mol % to 10.5 mol % $Na_2O$, and 0 mol % to 2.5 mol % $B_2O_3$.

In some examples, the composition comprises a combination of $SiO_2$, $Al_2O_3$, $R_2O$, $Y_2O_3$, and $TiO_2$. For example, the composition comprises 30 mol % to 50 mol % $SiO_2$, 18 mol % to 30 mol % $Al_2O_3$, 0 mol % to 22 mol % $R_2O$, 10 mol % to 15 mol % $Y_2O_3$, and 4 mol % to 14 mol % $TiO_2$. In some examples, the composition further comprises $ZrO_2$, where $R_2O$ comprises $Li_2O$ and $Na_2O$. For example, the composition comprises 0 mol % to 4 mol % $ZrO_2$, 0 mol % to 11.5 mol % $Li_2O$, and, 0 mol % to 10.5 mol % $Na_2O$.

EXAMPLES

The embodiments described herein will be further clarified by the following examples.

Example 1—Precursor Glass Composition Formation

Glasses having the oxide contents listed in Table 1 can be made via traditional methods. In some examples, the precursor glasses can be formed by thoroughly mixing the requisite batch materials (for example, using a tubular mixer) in order to secure a homogeneous melt, and subsequently placing into silica and/or platinum crucibles. The crucibles can be placed into a furnace and the glass batch melted and maintained at temperatures ranging from 1100° C. to 1400° C. for times ranging from about 6 hours to 24 hours. The melts can thereafter be poured into steel molds to yield glass slabs. Subsequently, those slabs can be transferred immediately to an annealer operating at about 400° C. to 700° C., where the glass is held at temperature for about 0.5 hour to 3 hours and subsequently cooled overnight. In another non-limiting example, precursor glasses are prepared by dry blending the appropriate oxides and mineral sources for a time sufficient to thoroughly mix the ingredients. The glasses are melted in platinum crucibles at temperatures ranging from about 1100° C. to 1400° C. and held at temperature for about 6 hours to 16 hours. The resulting glass melts are then poured onto a steel table to cool. The precursor glasses are then annealed at appropriate temperatures.

The embodied glass compositions can be ground into fine particles in the range of 1-10 microns (μm) by air jet milling or short fibers. The particle size can be varied in the range of 1-100 μm using attrition milling or ball milling of glass frits. Furthermore, these glasses can be processed into short fibers, beads, sheets or three-dimensional scaffolds using different methods. Short fibers are made by melt spinning or electric spinning; beads can be produced by flowing glass particles through a hot vertical furnace or a flame torch; sheets can be manufactured using thin rolling, float or fusion-draw processes; and scaffolds can be produced using rapid prototyping, polymer foam replication and particle sintering.

Continuous fibers can be easily drawn from the claimed composition using processes known in the art. For example, fibers can be formed using a directly heated (electricity passing directly through) platinum bushing. Glass cullet is loaded into the bushing, heated up until the glass can melt. Temperatures are set to achieve a desired glass viscosity (usually <1000 poise) allowing a drip to form on the orifice in the bushing (Bushing size is selected to create a restriction that influences possible fiber diameter ranges). The drip is pulled by hand to begin forming a fiber. Once a fiber is established it is connected to a rotating pulling/collection drum to continue the pulling process at a consistent speed. Using the drum speed (or revolutions per minute RPM) and glass viscosity the fiber diameter can be manipulated—in general the faster the pull speed, the smaller the fiber diameter. Glass fibers with diameters in the range of 1-100 μm can be drawn continuously from a glass melt. Fibers can also be created using an updraw process. In this process, fibers are pulled from a glass melt surface sitting in a box furnace. By controlling the viscosity of the glass, a quartz rod is used to pull glass from the melt surface to form a fiber. The fiber can be continuously pulled upward to increase the fiber length. The velocity that the rod is pulled up determines the fiber thickness along with the viscosity of the glass.

Example 2—Precursor Glass Compositions

Non-limiting examples of amounts of oxides for forming the precursor glasses are listed in Table 1.

TABLE 1

| Mol % | A | B | C | D | E | F | G | H | I | J |
|---|---|---|---|---|---|---|---|---|---|---|
| $SiO_2$ | 40.4 | 38.6 | 38.4 | 36.7 | 41.1 | 38.8 | 38.6 | 40.7 | 39.1 | 50.0 |
| $Al_2O_3$ | 29.1 | 29.0 | 28.0 | 26.9 | 29.0 | 29.4 | 28.1 | 29.2 | 27.9 | 18.0 |
| $Li_2O$ | 11.1 | 10.9 | 10.8 | 10.2 | | | | 5.6 | 5.3 | 10.9 |
| $Na_2O$ | | | | | 10.5 | 10.1 | 10.1 | 5.1 | 4.9 | |
| $Y_2O_3$ | 13.3 | 13.5 | 12.9 | 12.3 | 13.2 | 13.7 | 13.0 | 13.3 | 12.8 | 13.1 |
| $TiO_2$ | 6.0 | 7.8 | 9.9 | 13.8 | 6.1 | 8.0 | 10.0 | 6.0 | 10.0 | 4.0 |
| $ZrO_2$ | | | | | | | | | | 4.0 |
| Sum | 100 | 100 | 100 | 100 | 100 | 100 | 100 | 100 | 100 | 100 |
| $TiO_2/Y_2O_3$ | 0.45 | 0.58 | 0.77 | 1.12 | 0.46 | 0.58 | 0.77 | 0.45 | 0.78 | 0.30 |
| $\frac{TiO_2}{(Y_2O_3 + Al_2O_3)}$ | 0.14 | 0.18 | 0.24 | 0.35 | 0.14 | 0.18 | 0.24 | 0.14 | 0.25 | 0.13 |
| $TiO_2/SiO_2$ | 0.15 | 0.20 | 0.26 | 0.38 | 0.15 | 0.21 | 0.26 | 0.15 | 0.26 | 0.08 |
| $R_2O/Al_2O_3$ | 0.38 | 0.38 | 0.38 | 0.38 | 0.36 | 0.34 | 0.36 | 0.37 | 0.36 | 0.61 |

| Mol % | A1 | B1 | C1 | D1 | E1 | F1 | G1 | H1 | I1 | J1 | K1 |
|---|---|---|---|---|---|---|---|---|---|---|---|
| $SiO_2$ | 35.8 | 36.0 | 35.3 | 34.1 | 35.3 | 34.4 | 33.6 | 34.4 | 33.6 | 38.2 | 34.9 |
| $Al_2O_3$ | 29.1 | 30.9 | 28.9 | 31.0 | 27.5 | 26.9 | 26.2 | 26.9 | 26.2 | 29.8 | 27.2 |
| $Li_2O$ | 10.5 | 10.4 | 10.1 | 9.9 | | | | 10.1 | 9.8 | 11.1 | 10.2 |
| $Na_2O$ | | | | | 10.3 | 10.1 | 9.8 | | | | |
| $Y_2O_3$ | 10.6 | 8.7 | 12.1 | 11.9 | 12.9 | 12.6 | 12.3 | 12.6 | 12.3 | 14.0 | 12.8 |
| $TiO_2$ | 13.9 | 13.9 | 13.5 | 13.1 | 14.0 | 16.0 | 18.0 | 16.0 | 18.0 | 5.9 | 13.9 |
| $B_2O_3$ | | | | | | | | | | 1.0 | 1.0 |
| Sum | 100 | 100 | 100 | 100 | 100 | 100 | 100 | 100 | 100 | 100 | 100 |
| $TiO_2/Y_2O_3$ | 1.31 | 1.59 | 1.12 | 1.10 | 1.09 | 1.27 | 1.46 | 1.27 | 1.46 | 0.43 | 1.09 |
| $\frac{TiO_2}{(Y_2O_3 + Al_2O_3)}$ | 0.35 | 0.35 | 0.33 | 0.31 | 0.35 | 0.41 | 0.47 | 0.41 | 0.47 | 0.14 | 0.35 |
| $TiO_2/SiO_2$ | 0.39 | 0.39 | 0.38 | 0.38 | 0.40 | 0.46 | 0.54 | 0.46 | 0.54 | 0.16 | 0.40 |
| $R_2O/Al_2O_3$ | 0.36 | 0.34 | 0.35 | 0.32 | 0.38 | 0.38 | 0.38 | 0.38 | 0.38 | 0.37 | 0.38 |
| $Al_2O_3/Y_2O_3$ | 2.742 | 3.532 | 2.390 | 2.608 | 2.133 | 2.133 | 2.133 | 2.133 | 2.133 | 2.132 | 2.133 |

The ratios of $TiO_2$ to $Y_2O_3$, $TiO_2$ to the sum of $Y_2O_3$ and $Al_2O_3$, and $TiO_2$ to $SiO_2$ represent the ratio of the oxide component that partitions into a nucleating crystallite ($TiO_2$) to (A) another oxide in the Ti-containing phase ($Y_2O_3$); (B) two components which are similarly coordinated in the precursor glass ($Y_2O_3$ and $Al_2O_3$); and (C) a glass network former ($SiO_2$). These ratios are important because they describe the balance between nucleating phases and other crystalline phases. The ratio of $R_2O$ to $Al_2O_3$ is important for determining the charge-balance of the precursor glass, assuming all $R^+$ first goes to charge balance $Al^{3+}$. In other words, the ratio of $R_2O$ to $Al_2O_3$ is important for glass composition design because it represents the charge balance of the composition, which describes has a significant influence on composition structure and thus, its properties. Charge balance is also important in determining the ease in forming a glass. The ratio of $Al_2O_3$ to $Y_2O_3$ is important for determining the potential components that can partition into the yttrium aluminum garnet (YAG) phase, which is one phase that is being crystallized.

The glass compositions disclosed herein can be in any form, for example, particles, powder, microspheres, fibers, sheets, beads, scaffolds, woven fibers.

Example 3—Precursor Glass Composition Properties

Young's modulus, shear modulus, and Poisson's ratio are all measured at the same time using Resonant Ultrasound Spectroscopy, which is conducted as set forth in ASTM E1875-00e1. Moreover, ion exchange properties of the glasses were conducted in 100% $NaNO_3$ at 450° C. The ion-exchange process imparts a compressive stress layer in the glass material, which increases damage resistance to flaws that are within that compressive stress layer. The purpose of the testing and testing conditions is to demonstrate these glass materials are ion-exchangeable.

TABLE 2

|  | A | C | D | E | H | I | J | B1 | D1 | G1 | I1 | J1 | K1 |
|---|---|---|---|---|---|---|---|---|---|---|---|---|---|
| Poisson's Ratio | 0.266 | 0.270 | 0.262 | 0.263 | 0.269 | 0.265 | 0.263 | 0.267 | 0.273 | 0.258 | 0.270 | 0.271 | 0.265 |
| Young's Modulus, E (GPa) | 122 | 123 | 124 | 107 | 118 | 118 | 117 | 122 | 126 | 111 | 125 | 122 | 124 |
| Shear Modulus, G (GPa) | 48.1 | 48.5 | 49.2 | 42.5 | 46.3 | 46.7 | 46.3 | 48.0 | 49.6 | 44.0 | 49.2 | 47.8 | 48.9 |
| Δ wt. % after 4 hrs in $NaNO_3$ | 0.03 | 0.03 | 0.05 | 0.01 | 0.04 | 0.08 | — | — | — | — | — | — | — |
| Δ wt. % after 8 hrs in $NaNO_3$ | 0.03 | 0.04 | 0.08 | — | 0.06 | 0.12 | — | — | — | — | — | — | — |

The data in Table 2 illustrates the very high Young's modulus values of the precursor glasses. In comparison, typical glass compositions have Young's modulus values of only about 75 GPa. The low weight change after ion-exchange is one way to represent that ion-exchange worked successfully.

Example 4—Glass-Ceramic Composition Properties

After forming and testing the precursor glasses as described in Examples 1-3, the precursor glasses were subjected to a heat treatment (i.e., ceramming) as follows: (a) a first temperature ramp from room temperature (RT) to a nucleation step temperature at 5° C./min; (b) a first isothermal hold at the nucleation step temperature for a first predetermined time; (c) a second temperature ramp from the nucleation step temperature to a crystallization step temperature at 5° C./min; (d) a second isothermal hold at the crystallization step temperature for a second predetermined time; and (e) a final cooling from the crystallization step temperature to room temperature at the natural rate of cooling within the furnace.

Tables 3-6 show properties of the glass-ceramics formed as a result of the ceramming treatment. Characterization of the glass-ceramic Young's modulus, shear modulus, Poisson's Ratio, and ion exchange abilities were conducted as described above in Example 3. Fracture toughness was measured using known methods in the art such as, for example, using a chevron notch, short bar, notched beam, or the like, according to ASTM C1421-10. As recited in the present disclosure, fracture toughness value ($K_{1C}$) refers to a value as measured by chevron notched short bar (CNSB) method. Vickers hardness were measured via a Vicker's indenter and a 200 gram load.

TABLE 3

| | Ceramming Schedule<br>Nucleation Temp, 1st Isothermal Hold<br>850° C., 2 hrs<br>Crystallization Temp, 2 d Isothermal Hold<br>950° C., 2 hrs | | | |
|---|---|---|---|---|
| | A | B | C | D |
| Poisson's Ratio | 0.267 | — | 0.269 | 0.265 |
| Young's Modulus, E (GPa) | 159.8 | — | 161.5 | 157.3 |
| Shear Modulus, G (GPa) | 63.0 | — | 63.6 | 62.2 |
| Δ wt. % after 4 hrs in $NaNO_3$ | 0.07 | — | 0.16 | 0.16 |
| Δ wt. % after 8 hrs in $NaNO_3$ | 0.09 | — | 0.20 | 0.21 |
| Fracture Toughness (MPa * √m), 1stdev | 2.07, 0.20 | — | 1.92, 0.08 | 2.03, 0.22 |
| Vickers Hardness mean (kgf/mm$^2$), stdev, cov | 1091, 44, 4 | — | 1174, 26, 2 | 1150, 21, 2 |

| | Ceramming Schedule<br>Nucleation Temp, 1st Isothermal Hold<br>850° C., 2 hrs<br>Crystallization Temp, 2 d Isothermal Hold<br>1050° C., 4 hrs | | | |
|---|---|---|---|---|
| | A | B | C | D |
| Poisson's Ratio | — | 0.275 | 0.267 | 0.259 |
| Young's Modulus, E (GPa) | — | 172 | 169 | 174 |
| Shear Modulus, G (GPa) | — | 67.3 | 66.5 | 69.2 |
| Fracture Toughness (MPa * √m), 1stdev | 3.22, 0.50 | — | 1.94, 0.08 | — |
| Vickers Hardness mean (kgf/mm$^2$), stdev, cov | 1133, 38, 3 | — | 1192, 36, 3 | 1157, 50, 4 |

TABLE 4

| | Ceramming Schedule<br>Nucleation Temp, 1st Isothermal Hold<br>850° C., 2 hrs<br>Crystallization Temp, 2d Isothermal Hold<br>950° C., 4 hrs | | | | | |
|---|---|---|---|---|---|---|
| | E | F | G | H | I | J |
| Poisson's Ratio | 0.256 | — | — | 0.236 | 0.238 | 0.274 |
| Young's Modulus, E (GPa) | 119 | — | — | 136.7 | 142.0 | 124 |
| Shear Modulus, G (GPa) | 47.5 | — | — | 55.3 | 57.4 | 48.7 |
| Δ wt. % after 4 hrs in $NaNO_3$ | — | — | — | 0.13 | 0.29 | — |
| Δ wt. % after 8 hrs in $NaNO_3$ | — | — | — | 0.18 | 0.38 | — |
| Fracture Toughness (MPa * √m), 1 stdev | 1.39, 0.05 | — | — | 1.48, 0.19 | 0.98, 0.05 | 2.02, 0.43 |
| Vickers Hardness mean (kgf/mm$^2$), stdev, cov | 868, 55, 6 | — | — | 1124, 38, 3 | 1110, 35, 3 | 882, 71, 8 |

| | Ceramming Schedule<br>Nucleation Temp, 1st Isothermal Hold<br>850° C., 2 hrs<br>Crystallization Temp, 2 d Isothermal Hold<br>1050° C., 4 hrs | | | | | |
|---|---|---|---|---|---|---|
| | E | F | G | H | I | J |
| Poisson's Ratio | 0.239 | 0.224 | 0.228 | 0.243 | 0.235 | — |
| Young's Modulus, E (GPa) | 134 | 137 | 142 | 143 | 148 | — |
| Shear Modulus, G (GPa) | 54.1 | 56.1 | 58.0 | 57.7 | 59.7 | — |
| Fracture Toughness (MPa * √m), 1 stdev | 1.62, 0.04 | — | — | 1.14, 0.04 | 1.14, 0.09 | — |
| Vickers Hardness mean (kgf/mm$^2$), stdev, cov | 983, 7, 1 | — | — | 1076, 15, 1 | 1049, 20, 2 | — |

TABLE 5

| Ceramming Schedule<br>Nucleation Temp, 1st Isothermal Hold<br>850° C., 2 hrs<br>Crystallization Temp, 2 d Isothermal Hold<br>950° C., 4 hrs | | | | |
|---|---|---|---|---|
| | A1 | B1 | C1 | D1 |
| Poisson's Ratio | 0.254 | 0.255 | — | 0.262 |
| Young's Modulus, E (GPa) | 158 | 156 | — | 163 |
| Shear Modulus, G (GPa) | 62.9 | 62.3 | — | 64.5 |
| XRD-Phase 1 | $Y_2Ti_2O_7$ | $Y_2Ti_2O_7$ | $Y_2Ti_2O_7$ | $Y_2Ti_2O_7$ |
| XRD-Phase 2 | $LiAlSi_2O_6$ | $LiAlSi_2O_6$ | — | $LiAlSi_2O_6$ |
| XRD-Phase 3 | — | — | $Y_2Si_2O_7$ | — |

| Ceramming Schedule<br>Nucleation Temp, 1st Isothermal Hold<br>850° C., 2 hrs<br>Crystallization Temp, 2 d Isothermal Hold<br>1050° C., 4 hrs | | | | |
|---|---|---|---|---|
| | A1 | B1 | C1 | D1 |
| Poisson's Ratio | 0.260 | 0.261 | 0.264 | 0.267 |
| Young's Modulus, E (GPa) | 166 | 162 | 174 | 177 |
| Shear Modulus, G (GPa) | 65.8 | 64.1 | 68.9 | 69.8 |
| XRD-Phase 1 | $Y_2Ti_2O_7$ | $Y_2Ti_2O_7$ | $Y_2Ti_2O_7$ | $Y_2Ti_2O_7$ |
| XRD-Phase 2 | $Y_2Si_2O_7$ | $Y_2Si_2O_7$ | $Y_2Si_2O_7$ | $Y_2Si_2O_7$ |
| XRD-Phase 3 | $Y_2Si_2O_7$* | $Y_2Si_2O_7$* | $Y_2Si_2O_7$* | $Y_2Si_2O_7$* |
| XRD-Phase 4 | $LiAlSi_2O_6$ | $LiAlSi_2O_6$ | $LiAlSi_2O_6$ | $LiAlSi_2O_6$ |
| XRD-Phase 5 | $LiAl_5O_8$ | $LiAl_5O_8$ | $LiAl_5O_8$ | $LiAl_5O_8$ |

| Ceramming Schedule<br>Nucleation Temp, 1st Isothermal Hold<br>850° C., 2 hrs<br>Crystallization Temp, 2 d Isothermal Hold<br>1200° C., 4 hrs | | | | |
|---|---|---|---|---|
| | A1 | B1 | C1 | D1 |
| Poisson's Ratio | — | 0.263 | 0.256 | — |
| Young's Modulus, E (GPa) | — | 161 | 174 | — |
| Shear Modulus, G (GPa) | — | 63.8 | 69.3 | — |
| XRD-Phase 1 | $Y_2Ti_2O_7$ | $Y_2Ti_2O_7$ | $Y_2Ti_2O_7$ | $Y_2Ti_2O_7$ |
| XRD-Phase 2 | $Y_3Al_5O_{12}$ | $Y_3Al_5O_{12}$ | $Y_2Si_2O_7$ | $Y_3Al_5O_{12}$ |
| XRD-Phase 3 | $LiAlSi_2O_6$ | $LiAlSi_2O_6$ | $LiAlSi_2O_6$ | $LiAlSi_2O_6$ |
| XRD-Phase 4 | $LiAl_5O_8$ | $LiAlSi_2O_6$* | $LiAl_5O_8$ | $LiAl_5O_8$ |
| XRD-Phase 5 | — | $LiAl_5O_8$ | — | — |
| XRD-Phase 6 | — | $Y_2Si_2O_7$ | — | — |

TABLE 6

| Ceramming Schedule<br>Nucleation Temp, 1st Isothermal Hold<br>850° C., 2 hrs<br>Crystallization Temp, 2 d Isothermal Hold<br>1050° C., 4 hrs | | | | | |
|---|---|---|---|---|---|
| | E1 | F1 | G1 | H1 | I1 |
| Poisson's Ratio | 0.226 | 0.226 | 0.228 | 0.266 | 0.26 |
| Young's Modulus, E (GPa) | 141 | 139 | 139 | 172 | 170 |
| Shear Modulus, G (GPa) | 57.4 | 56.7 | 56.4 | 68.1 | 67.4 |
| XRD - Phase 1 | $Y_2Ti_2O_7$ | $Y_2Ti_2O_7$ | $Y_2Ti_2O_7$ | $Y_2Ti_2O_7$ | $Y_2Ti_2O_7$ |
| XRD - Phase 2 | $NaAlSiO_4$ | $NaAlSiO_4$ | $NaAlSiO_4$ | $Y_2Si_2O_7$ | $Y_2Si_2O_7$ |
| XRD - Phase 3 | $Na_2TiOSiO_4$ | $Na_2TiOSiO_4$ | $Na_2TiOSiO_4$ | $LiAlSi_2O_6$ | $LiAlSi_2O_6$ |
| XRD - Phase 4 | $Na_2Ti_7O_{15}$ | $Na_2Ti_7O_{15}$ | $Na_2Ti_7O_{15}$ | $LiAl_5O_8$ | $LiAl_5O_8$ |

| Ceramming Schedule<br>Nucleation Temp, 1st Isothermal Hold<br>850° C., 2 hrs<br>Crystallization Temp, 2 d Isothermal Hold<br>1200° C., 4 hrs | | | | | |
|---|---|---|---|---|---|
| | E1 | F1 | G1 | H1 | I1 |
| Poisson's Ratio | — | — | — | — | 0.261 |
| Young's Modulus, E (GPa) | — | — | — | — | 161 |
| Shear Modulus, G (GPa) | — | — | — | — | 63.9 |
| XRD - Phase 1 | — | — | — | $Y_2Ti_2O_7$ | $Y_2Ti_2O_7$ |
| XRD - Phase 2 | — | — | — | $Y_3Al_5O_{12}$ | $Y_3Al_5O_{12}$ |
| XRD - Phase 3 | — | — | — | $LiAlSi_2O_6$ | $LiAlSi_2O_6$ |
| XRD - Phase 4 | — | — | — | $LiAl_5O_8$ | $LiAl_5O_8$ |

Example 5—Back-Scattered Scanning Electron Microscopy

FIGS. 1A-1I illustrate back-scattered scanning electron microscopy (SEM) images of Li-only containing glass-ceramic microstructures, summarized in Table 7 below.

TABLE 7

| FIGS | 1A | 1B | 1C | 1D | 1E | 1F | 1G | 1H | 1I |
|---|---|---|---|---|---|---|---|---|---|
| Sample | A | | D | | A1 | C1 | D1 | H1 | I1 |
| Li$_2$O Content (mol %) | 11.1 | | 10.2 | | 10.5 | 10.1 | 9.9 | 10.1 | 9.8 |
| Na$_2$O Content (mol %) | | | | | 0 | | | | |
| TiO$_2$ Content (mol %) | 6.0 | | 13.8 | | 13.9 | 13.5 | 13.1 | 16.0 | 18.0 |
| Nucleation Temp (° C.) | | | | | 850 | | | | |
| 1st Isothermal Hold (hrs) | | | | | 2 | | | | |
| Crystallization Temp (° C.) | 950 | 1050 | 950 | 1050 | | | 1200 | | |
| 2 d Isothermal Hold (hrs) | | | | | 4 | | | | |

Figure 1B:
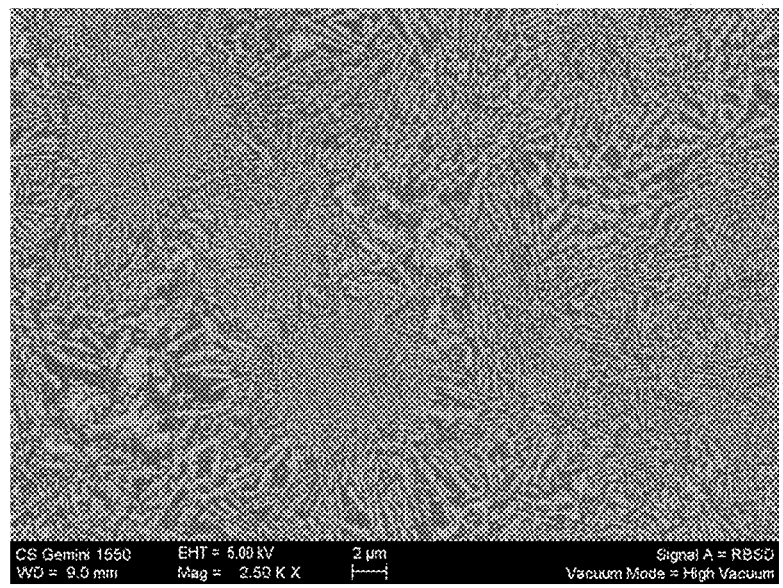
Figure 1C:
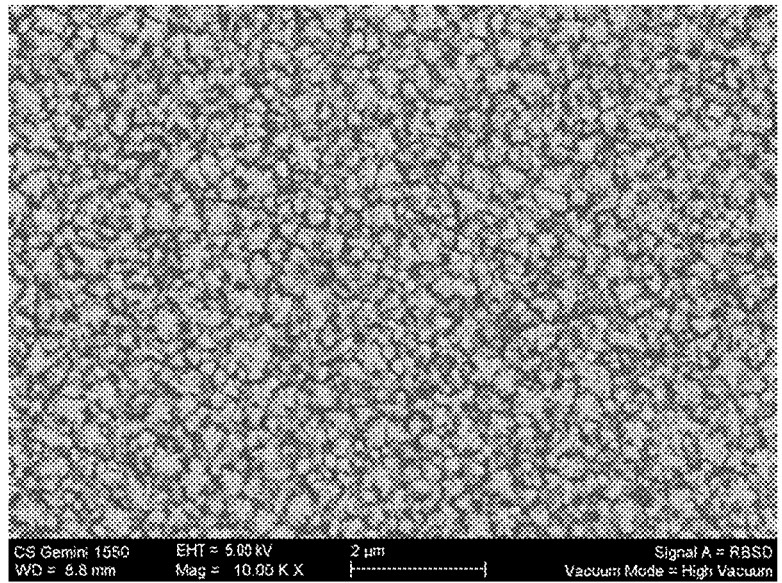
Figure 1D:
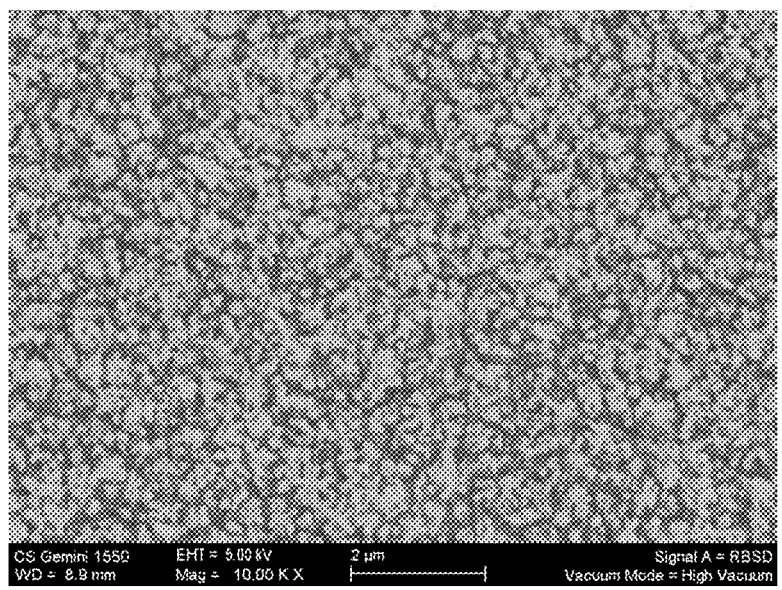
Figure 1E:
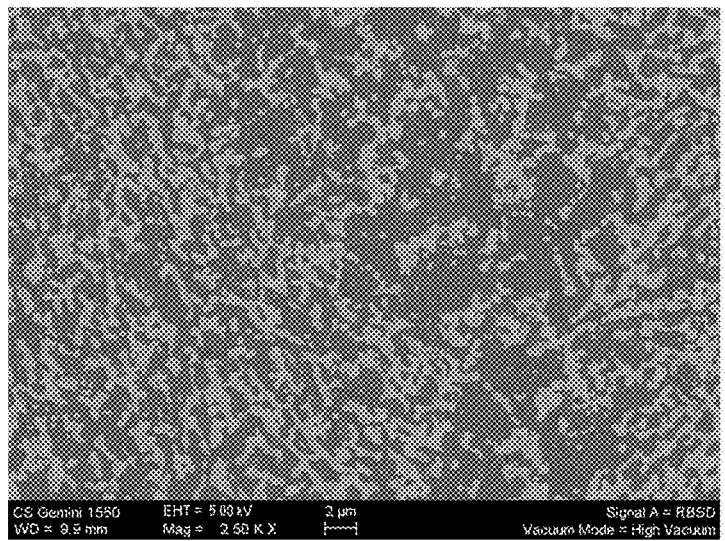
Figure 1F:
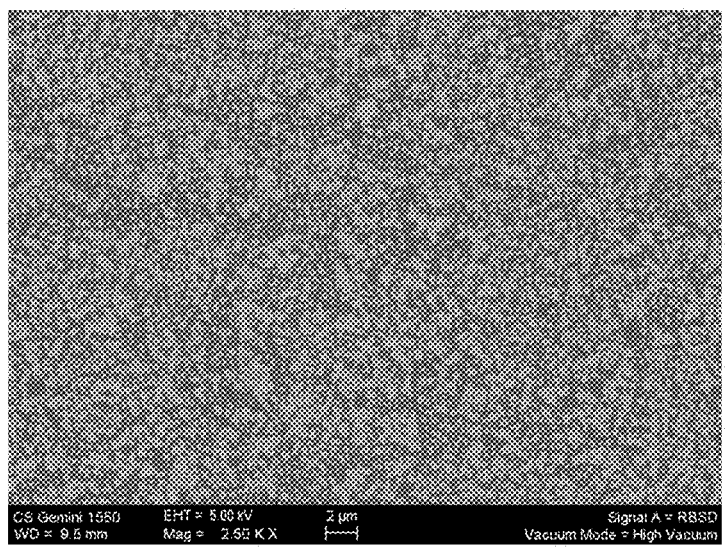
Figure 1G:
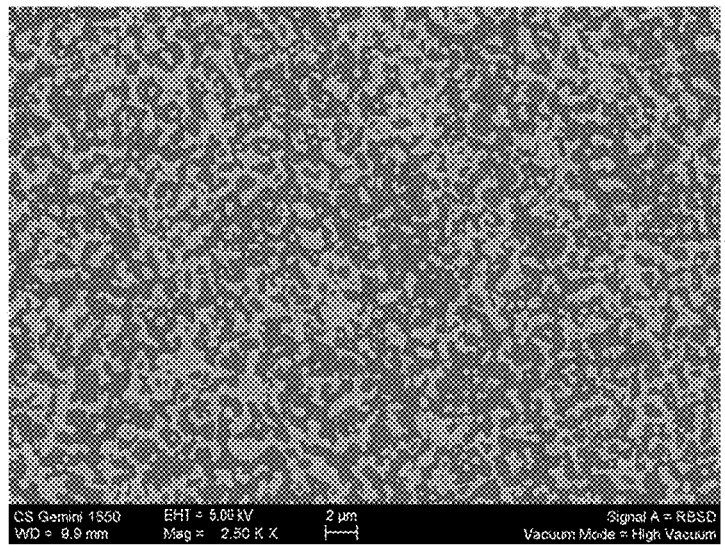
Figure 1H:
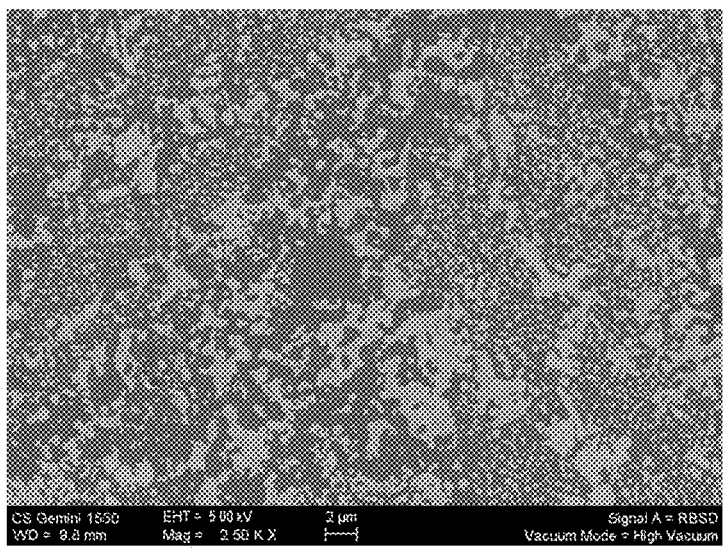
Figure 1I:
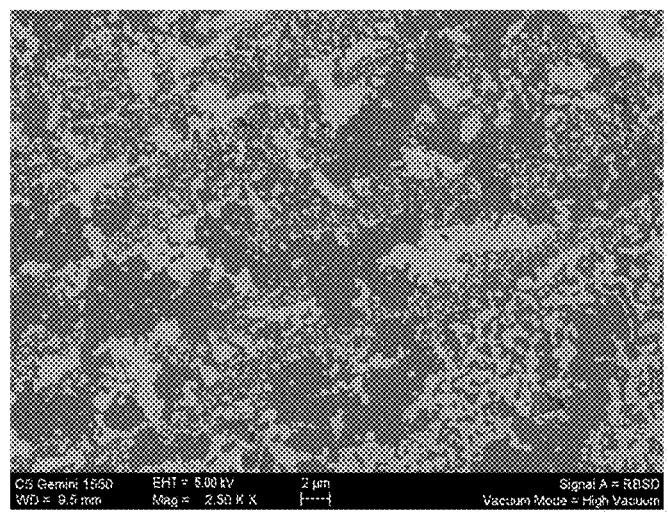

As the amount of nucleating agent (TiO$_2$) is increased in the bulk composition, nucleation and resulting crystallization becomes more uniform (i.e., the crystallization—and resulting microstructure—is consistent across the sample material testing area). For example, FIG. 1B is less uniform than FIG. 1C. For example, in comparing FIG. 1A with FIG. 1C (both with nucleation temperatures of 850° C. held for 2 hrs and crystallization temperatures of 950° C. held for 4 hrs), even though both sample A and D have similar Young's Modulus (A: 159.8 GPa; D: 157.3 GPa) and fracture toughness (A: 2.07 MPa*√m; D: 2.03 MPa*√m), the microstructures for each are unique and distinct. The large needles and spherulitic structure of sample A likely contributes to the extremely high fracture toughness values. Sample A includes half the amount of TiO$_2$ nucleating agent as sample D. In other words, sample A (FIG. 1A) shows a structure with numerous random, cross-hatched structures which grew quickly and, given their random locations in the material, were not well nucleated. In contrast, sample D (FIG. 1D), with double the amount of TiO$_2$ nucleating agent as sample A, has a much finer, more consistent and uniform structure due to increased nucleation. Similar trends are observed in comparing FIG. 1B with FIG. 1D (both with nucleation temperatures of 850° C. held for 2 hrs and crystallization temperatures of 1050° C. held for 4 hrs).

Figure 2A:
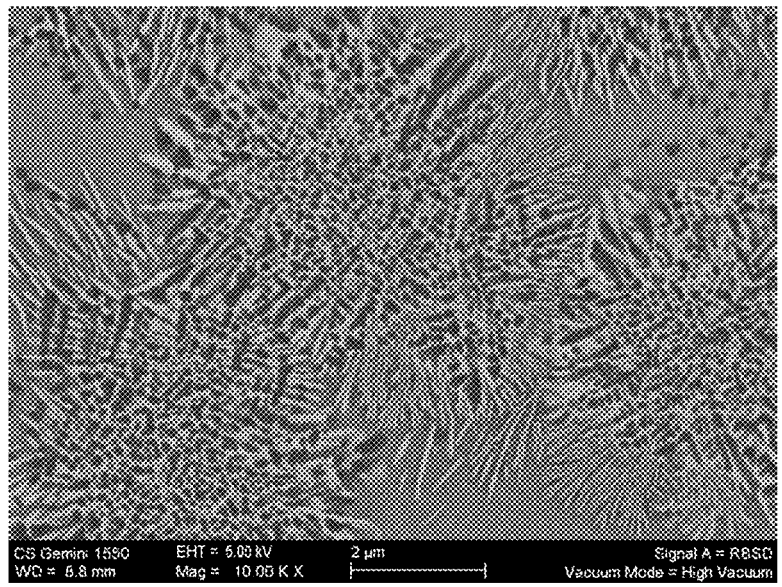
FIGS. 2A and 2B illustrate back-scattered SEM images of Na-only containing glass-ceramic microstructures, according to some embodiments.
Figure 2B:
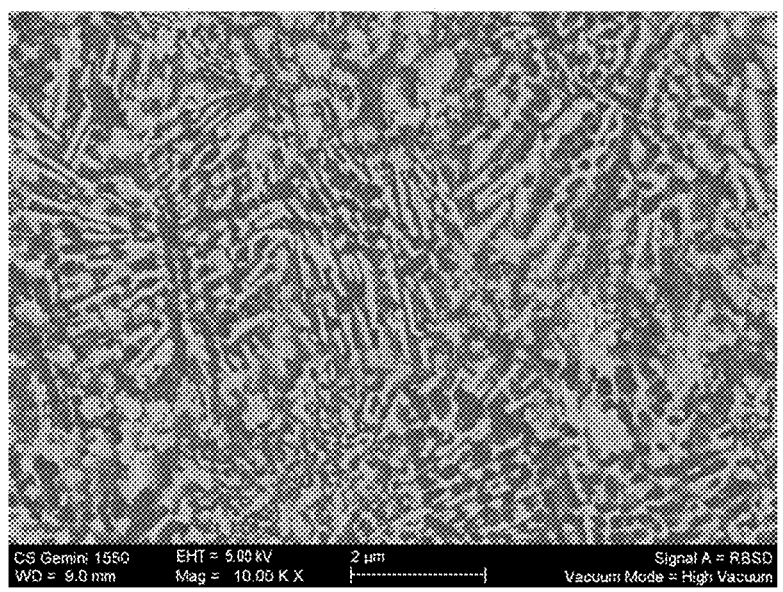

FIGS. 2A and 2B illustrate back-scattered SEM images of Na-only containing glass-ceramic microstructures, summarized in Table 8 below.

TABLE 8

| | FIG. 2A | FIG. 2B |
|---|---|---|
| Sample | E | |
| Li$_2$O Content (mol %) | 0 | |
| Na$_2$O Content (mol %) | 10.5 | |
| TiO$_2$ Content (mol %) | 6.1 | |
| Nucleation Temp (° C.) | 850 | 850 |
| 1st Isothermal Hold (hrs) | 2 | 2 |
| Crystallization Temp (° C.) | 950 | 1050 |
| 2 d Isothermal Hold (hrs) | 4 | 4 |

The microstructure of sample E is unique compared to that of Li-only compositions (e.g., those of Table 7). Structural differences as a result of an increase in crystallization temperature from FIG. 2A to FIG. 2B are not as pronounced for Na-only containing glass-ceramic microstructures as they were for Li-only containing glass-ceramic microstructures. For example, Young's Modulus for a ceramming schedule of nucleation at 850° C./2 hrs and crystallization at 950/4 hrs is 119 GPa versus 134 GPa when cerammed at nucleation at 850° C./2 hrs and crystallization at 1050/4 hrs, only about a 13% increase. This is likely due to both phases crystallizing (not as strong) and weaker microstructure.

Figure 3A:
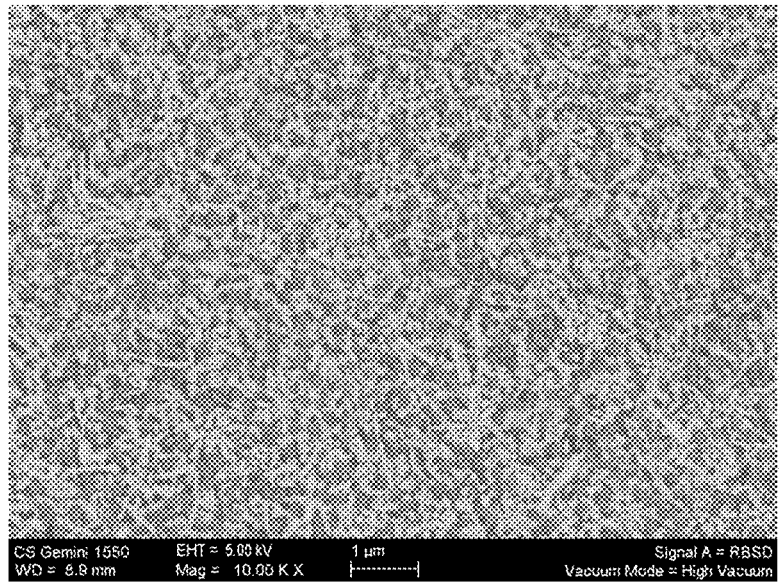
FIGS. 3A and 3B illustrate back-scattered SEM images of mixed alkali (e.g., Li- and Na-) containing glass-ceramic microstructures, according to some embodiments.
Figure 3B:
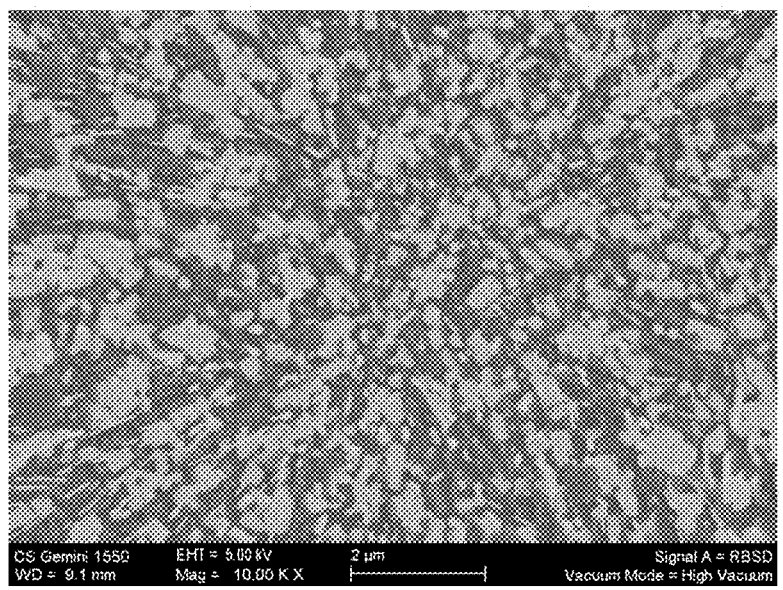

FIGS. 3A and 3B illustrate back-scattered SEM images of mixed alkali (e.g., Li- and Na-) containing glass-ceramic microstructures, summarized in Table 9 below. The microstructure of FIG. 3A is much finer-scaled than the microstructure of FIG. 3B.

TABLE 9

| | FIG. 3A | FIG. 3B |
|---|---|---|
| Sample | I | |
| Li$_2$O Content (mol %) | 5.3 | |
| Na$_2$O Content (mol %) | 4.9 | |
| TiO$_2$ Content (mol %) | 10.0 | |
| Nucleation Temp (° C.) | 850 | 850 |
| 1st Isothermal Hold (hrs) | 2 | 2 |
| Crystallization Temp (° C.) | 950 | 1050 |
| 2 d Isothermal Hold (hrs) | 4 | 4 |

As expected, measured strength properties lie in between those of Li- and Na-only compositions: Young's Modulus for sample D (Li-only): 157.3 GPa to 174 GPa, sample E (Na-only): 119 GPa to 134 GPa, and sample I (Li- and Na-containing): 142 GPa to 148 GPa. However, the microstructure is significantly different than either Li- and Na-only compositions.

Figure 4:
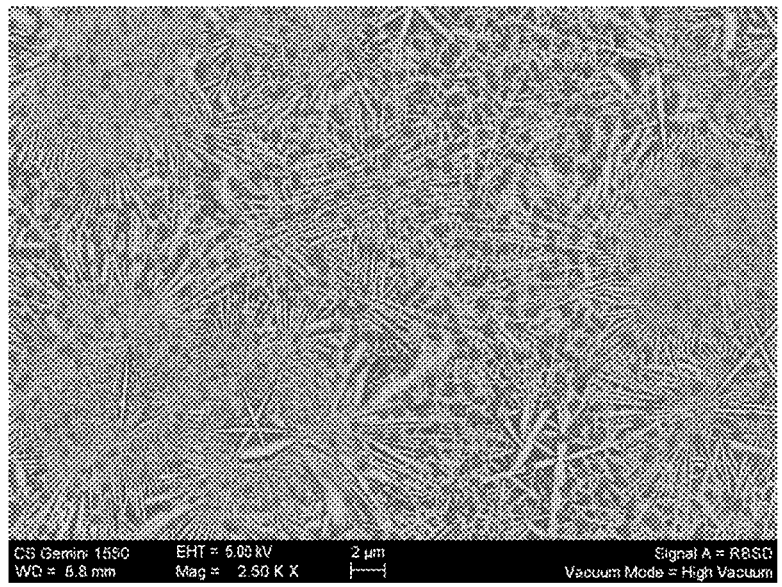
FIG. 4 illustrates back-scattered SEM images of high-$SiO_2$, low-$Al_2O_3$, and low-$ZrO_2$-containing glass-ceramic microstructure, according to some embodiments.

FIG. 4 illustrates back-scattered SEM images of high-SiO$_2$ (50.0 mol %), low-Al$_2$O$_3$ (18.0 mol %), and low-ZrO$_2$ (4.0 mol %)-containing glass-ceramic microstructures. Specifically, FIG. 4 shows sample J, which is cerammed at a nucleation temperature of 850° C./2 hrs and a crystallization temperature of 950° C./4 hrs. Sample J has a significantly different microstructure than those described in FIGS. 1A-3B in that it is much more spherulitic and needle-like.

Thus, as presented herein, novel glass and glass-ceramic compositions are disclosed having predictable, superior mechanical properties. The mechanical and elastic behavior of the glass compositions disclosed herein are superior to many commercially-available glass compositions. For example, compositions typically used in handheld device, memory disk, and fiber applications have a Young's modulus of about 65 GPa to 75 GPa, whereas Young's modulus of the glass compositions disclosed herein range much higher, at between 107 GPa to 126 GPa. These values are sufficiently high that the precursor glasses of the disclosed glass-ceramics are competitive with many transparent glass-ceramics, a significant feat for fully amorphous materials. Moreover, the precursor glass compositions of the present applications may be chemically strengthened (as indicated by preliminary weight gain data) while also having high fracture toughness and hardness.

After heat-treatment, the glass compositions become opaque, forming white glass-ceramics even more mechanically advantaged than the precursor glasses (i.e., having higher modulus values). The range of glass-ceramic Young's modulus values is 119 GPa to 177 GPa, depending on composition and ceramming schedule. Fracture toughness typically scales with Young's modulus, suggesting these materials also have high fracture toughness, and thus, an improved strength for a given flaw size population as compared to materials with lower fracture toughness values (e.g., more typical glasses). Finally, the hardness of these materials is also high, spanning a range from 868 $kgf/mm^2$ to 1192 $kgf/mm^2$ for Vickers hardness. In comparison, Vickers hardness for typical glasses are in a range of 550 $kgf/mm^2$ to 700 $kgf/mm^2$.

In addition, the glass-ceramics provided herein can be chemically strengthened, which increases the depth at which surface flaws can penetrate before failure. At 450° C. (a low temperature for the glass-ceramics) after only 4 and 8 hours, there was between 0.07% to 0.29% and 0.09% to 0.38% weight increase. At higher temperatures and for longer times, more ion-exchange will occur, resulting in even higher surface compressive stresses and, thus, higher damage resistance. Such damage resistance is key for handheld device applications utilizing glass/glass-ceramic protective covers.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

References herein to the positions of elements (e.g., "top," "bottom," "above," "below," "first," "second," etc.) are merely used to describe the orientation of various elements in the FIGURES. It should be noted that the orientation of various elements may differ according to other exemplary embodiments, and that such variations are intended to be encompassed by the present disclosure. Moreover, these relational terms are used solely to distinguish one entity or action from another entity or action, without necessarily requiring or implying any actual such relationship or order between such entities or actions.

Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims, as interpreted according to the principles of patent law, including the doctrine of equivalents.

It will be understood by one having ordinary skill in the art that construction of the described disclosure, and other components, is not limited to any specific material. Other exemplary embodiments of the disclosure disclosed herein may be formed from a wide variety of materials, unless described otherwise herein.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims. In other words, the terms "about," "approximately," and the like, mean that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art.

Thus, a glass that is "free" or "essentially free" of a component is one in which that component is not actively added or batched into the glass, but may be present in very small amounts as a contaminant (e.g., 500, 400, 300, 200, or 100 parts per million (ppm) or less or).

As utilized herein, "optional," "optionally," or the like are intended to mean that the subsequently described event or circumstance can or cannot occur, and that the description includes instances where the event or circumstance occurs and instances where it does not occur. As used herein, the indefinite articles "a," "an," and the corresponding definite article "the" mean "at least one" or "one or more," unless otherwise specified.

With respect to the use of substantially any plural and/or singular terms herein, those having skill in the art can translate from the plural to the singular and/or from the singular to the plural as is appropriate to the context and/or application. The various singular/plural permutations may be expressly set forth herein for the sake of clarity.

Unless otherwise specified, all compositions are expressed in terms of as-batched mole percent (mol %). As will be understood by those having ordinary skill in the art, various melt constituents (e.g., silicon, alkali- or alkaline-based, boron, etc.) may be subject to different levels of volatilization (e.g., as a function of vapor pressure, melt time and/or melt temperature) during melting of the constituents. As such, the as-batched mole percent values used in relation to such constituents are intended to encompass values within ±0.5 wt. % of these constituents in final, as-melted articles. With the forgoing in mind, substantial compositional equivalence between final articles and as-batched compositions is expected. For example, substantial compositional equivalence is expected between the precursor glass and glass-ceramic after the step of heat treatment (ceramming).

It will be apparent to those skilled in the art that various modifications and variations can be made without departing from the spirit or scope of the claimed subject matter. Accordingly, the claimed subject matter is not to be restricted except in light of the attached claims and their equivalents.

What is claimed is:

1. A glass-ceramic having a Young's modulus in a range of 119 GPa to 177 GPa, comprising homogenous and internally nucleated crystalline microstructures, the glass-ceramic having a composition, comprising:
   30 mol % to 40 mol % $SiO_2$;
   25 mol % to 35 mol % $Al_2O_3$;
   8 mol % to 14 mol % $Y_2O_3$;
   4 mol % to 18 mol % $TiO_2$; and
   5 mol % to 25 mol % $R_2O$,
   wherein $R_2O$ is the sum of $Na_2O$, $K_2O$, $Li_2O$, $Rb_2O$, and $Cs_2O$.

2. The glass-ceramic of claim 1, wherein $R_2O$ consists of $Na_2O$ or $Li_2O$.

3. The glass-ceramic of claim 1, wherein $R_2O$ comprises 0 mol % to 12.5 mol % $Na_2O$.

4. The glass-ceramic of claim 1, wherein $R_2O$ comprises 0 mol % to 12.5 mol % $Li_2O$.

5. The glass-ceramic of claim 1, further comprising 0 mol % to 2.5 mol % $B_2O_3$.

6. The glass-ceramic of claim 1, further comprising 0 mol % to 4 mol % $ZrO_2$.

7. The glass-ceramic of claim 1, comprising:
0 mol % to 12.5 mol % $Li_2O$;
0 mol % to 10.5 mol % $Na_2O$; and
0 mol % to 2.5 mol % $B_2O_3$.

8. The glass-ceramic of claim 1, comprising:
0 mol % to 11.5 mol % $Li_2O$;
0 mol % to 10.5 mol % $Na_2O$; and
0 mol % to 4 mol % $ZrO_2$.

* * * * *